United States Patent [19]

Westell

[11] Patent Number: 4,797,745

[45] Date of Patent: Jan. 10, 1989

[54] VIDEO IMAGE ENHANCER

[75] Inventor: William E. Westell, Weston, Mass.

[73] Assignee: Baird Corporation, Bedford, Mass.

[21] Appl. No.: 700,620

[22] Filed: Feb. 11, 1985

[51] Int. Cl.$^4$ .................. H04N 5/57; H04N 5/14; H04N 5/202

[52] U.S. Cl. .................... 358/169; 358/166; 358/164

[58] Field of Search ............ 358/164, 166, 168, 169, 358/171–175, 211

[56] References Cited

U.S. PATENT DOCUMENTS

| | | | |
|---|---|---|---|
| 2,876,349 | 3/1959 | Rogers | 358/164 X |
| 3,633,044 | 1/1972 | Buckstad | 358/164 X |
| 4,366,440 | 12/1982 | Olson et al. | 358/164 X |
| 4,503,464 | 3/1985 | Dielhof | 358/164 |

OTHER PUBLICATIONS

Freeman et al., "Variable Gamma Corrector Improves Television Video Signals," *Electronic Engineering*, Sep. '70, pp. 90–93.

Primary Examiner—Stephen C. Buczinski
Assistant Examiner—Linda J. Wallace
Attorney, Agent, or Firm—Morse, Altman, Dacey & Benson

[57] ABSTRACT

A video image enhancer is disclosed for use in surveillance at low light levels to enhance dark and/or low contrast segments of a composite video signal of a surveyed scene by subjecting the dark and/or low contrast segments thereof to high gain and bright and/or high contrast segments to low gain. The video image enhancer includes an input designed to receive the composite video signal, a device provided with a dc restorer circuit and a variable potentiometer to yield an adjustable-bias dc clamp of the composite video signal, a second variable potentiometer for adjusting the high-gain slope of the device, a diode clamp connected to the device's output, and a pair of drivers coupled to the device's output to provide a low impedance output video signal with its dark and/or low contrast segments enhanced. Preferably, the device is a non-inverting operational amplifier. Preferably, the pair of drivers comprise a pair of NPN transistors connected in an emitter-base configuration.

7 Claims, 2 Drawing Sheets

VIDEO IMAGE ENHANCER

BACKGROUND OF THE INVENTION

1. Field of the Invention

This present invention relates generally to video image enhancers and, more particularly, to a video image enhancer for use in surveillance at low light levels.

2. The Prior Art

Video surveillance at low light levels, even with artificial lighting, often presents a problem involving dead spots where the contrast and/or the light level is too low due to the unevenness of the illumination. Efforts at removing these dead spots have centered about improving the intensity distribution and/or the direction of the illumination.

There is a need to address this problem from a different angle, namely by improving the video equipment itself, yet in a simple and inexpensive manner.

SUMMARY OF THE INVENTION

It is a principal object of the present invention to overcome the above disadvantages by providing a video image enhancer for use in video surveillance at low contrasts and/or low light levels that can be inserted, in a loop-through mode, in the video line between a video camera and a monitor having a video screen.

More specifically, it is an object of the present invention to provide a video image enhancer for use in video surveillance at low light levels and designed to enhance low contrast, e.g., dark segments of a composite video signal of a scene surveyed by a video camera and to feed an appropriately enhanced signal to a video monitor provided with a video screen and including automatic gain control circuits. The video image enhancer comprises an input to receive the composite video signal, a device provided with a dc restorer circuit and a variable potentiometer to give an adjustable-bias dc clamp of the composite video signal, a second variable potentiometer for adjusting the voltage gain of the device, a diode clamp circuit connected to the output of the device, and drivers coupled to the device's output to provide a low impedance output video signal, with its dark segments enhanced, to the video monitor. Preferably, the device is a non-inverting operational amplifier. Preferably, the drivers are a pair of transistors connected in an emitter-follower configuration.

Other objects of the present invention will in part be obvious and will in part appear hereinafter.

The invention accordingly composes the video image enhancer of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
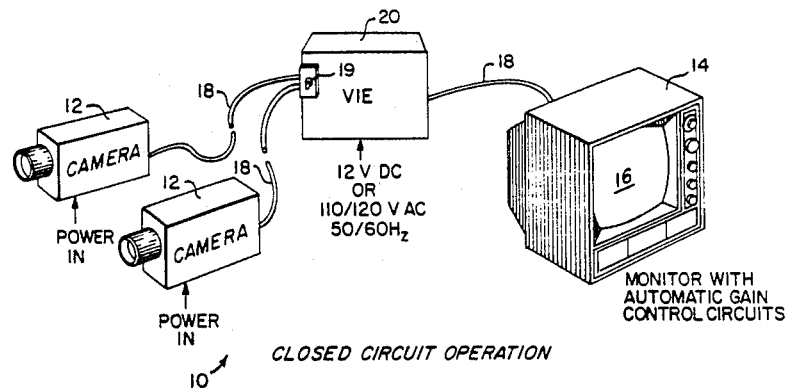
FIG. 1 is a schematic perspective of a video surveillance system incorporating a video image enhancer (VIE) according to the invention.

In FIG. 1 there is shown, in schematic perspective, a video surveillance system 10 comprised of one or more video cameras 12 (up to ten) and a video monitor 14 provided with a video screen 16 and connected with the cameras 12 via video lines 18 and a video switch 19, and a video image enhancement means (VIE) 20 connected in the video lines 18 therebetween, in a loop-through mode. Preferably, the video lines 18 are coaxial cable video lines.

The video surveillance system 10 is designed for round-the-clock surveillance, both indoors and outdoors, including at low light levels and during the night and with or without the employment of artificial lighting. The VIE 20 of the video surveillance system 10 is designed to enhance dark and/or low contrast segments of a composite video signal of a surveyed scene by subjecting the dark and/or low contrast segments thereof to high gain and the bright and/or high contrast segments thereof to low gain. In systems of this kind and without the video image enhancer (VIE) 20 of the invention being present, a recurrent common problem encountered has been the presence of dead spots on the video screen 16 in areas of a surveyed scene where the contrast and/or the light level has been too low due to the unevenness of the illumination, natural and/or artificial. It is the function of the VIE 20 to bring these dead spots to life efficiently yet simply and in an inexpensive manner.

Basically, the VIE 20 processes the composite video signal in the dark areas thereof to provide very high gain where it counts most and effects that without saturation. This signal processing by the VIE 20 automatically enhances the contrast and the brightness in the dark areas independently so that a bright area does not mask a dim area.

In order to achieve economy in large installations, one video image enhancement means (VIE) 20 can encompass up to ten video signals selected by the video switch 19 so as to enhance for dead spots in scenes surveyed by up to ten video cameras 12 per one video surveillance system 10. This video enhancement means will be described with reference to FIG. 2.

Figure 2:
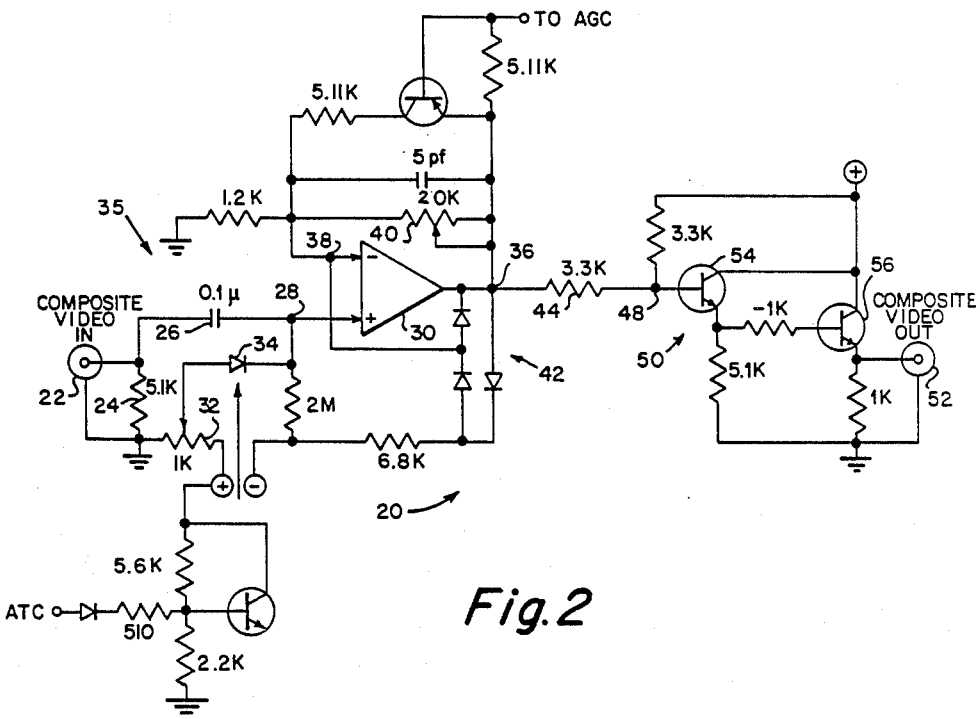
FIG. 2 is a circuit schematic of the video image enhancer of FIG. 1.

In FIG. 2 is depicted a circuit schematic of the video image enhancer (VIE) 20 shown in and described with reference to FIG. 1. VIE 20 comprises an input 22 designed to receive a composite video signal generated by a video camera 12 and selected by the video switch 19. The composite video signal generated by the video camera 12 is representative of a scene surveyed by the camera 12 and it includes both dark and bright segments. The dark segments are representative of the dead spots in the surveyed scene where the contrast and/or the light level, whether natural and/or artifical, is too low due to the unevenness of the illumination.

The composite video signal arriving at the input 22 of the VIE 20 is coupled, via a resistance 24—capacitance 26 network, to a positive non-inverting input 28 of a device 30. The device 30 is designed to amplify the dark segments of the composite video signal by subjecting the dark segments to high gain while subjecting the bright segments thereof to low gain. Preferably, the device 30 is a non-inverting operational amplifier. A variable potentiometer 32, a diode 34 and a capacitor 26 comprise a direct current restorer circuit 35 at the input 28 of the device 30. The function of the potentiometer 32 and dc current restorer circuit 35 is to provide an adjustable-bias dc clamp of the incoming composite video signal. In a feedback loop between its output 36 and its negative input 38, the device 30 is provided with a further variable potentiometer 40 for providing an adjustable gain/slope of the incoming composite video signal appearing at the output 36 of the device 30. A signal shaping network 42 in the form of a diode clamp also is shown parallel coupled to the output 36 of the device 30.

The composite video signal, duly amplified in its dark segments and appropriately shaped, appearing at the output 36 of the device 30 is coupled, via a resistor 44, to an input 48 of a driver circuit 50. The driver circuit 50 is designed to provide a low impedance output video signal at its output 52, suitable for driving the coaxial cable video line 18 to the video monitor 14. The driver circuit 50 preferably comprises a pair of NPN transistors 54 and 56 connected in an emitter-follower Darlington configuration. The input 48 of the driver circuit 50 is shown connected to the base of the transistor 54, whose emitter is connected to the base of the transistor 56. The low impedance output video signal of the driver circuit 50 appearing at its output 52 is taken directly from the emitter of the transistor 56.

Figure 3:
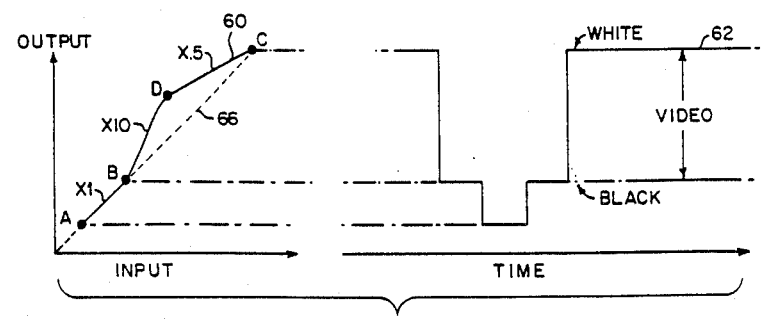
FIG. 3 displays curves helpful in understanding the principles of the invention.

In FIG. 3 there are shown two curves: curve 60 plotting the transfer characteristics of input against output of the VIE 20 and, curve 62 plotting the video signal output against time. As curve 60 indicates, the input signal and the output signal at point C and between points A and B are equal.

Figure 4:
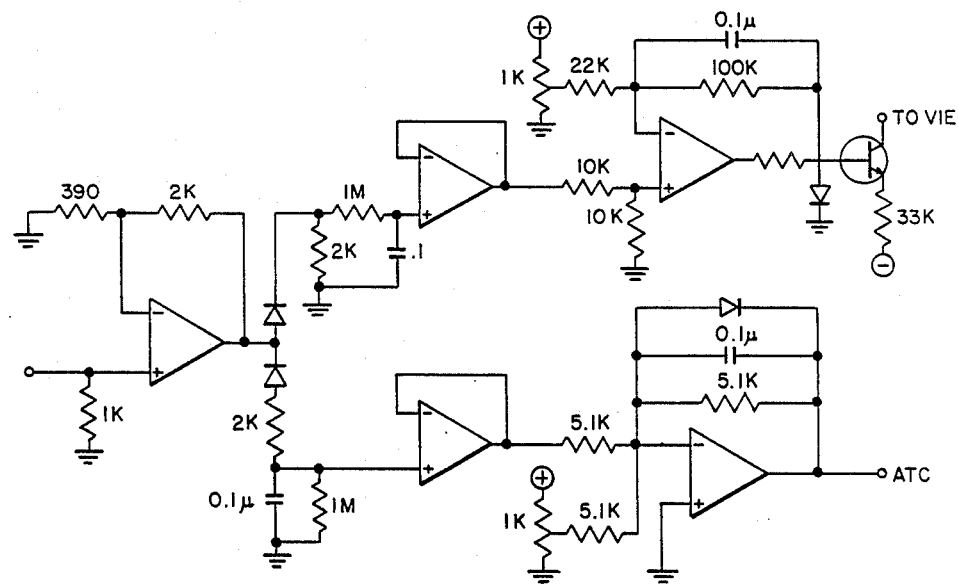
FIG. 4 is a circuit schematic of an automatic gain control circuit for use in the video surveillance system of FIG. 1.

The transfer characteristics 60 of the VIE 20 are effected between points A, B, D and C, B being black, by adjusting the potentiometers 32 and 40. The potentiometers 32 and 40 can be set manually or automatically, controlled by automatic gain control circuits, as available in video monitor 14. In either event, the potentionmeters 32 and 40 are initially adjusted for the desired dynamic range. Thereafter, the potentiometers 32 and 40 are controlled manually. Alternatively, the transfer characteristics 60 of the VIE 20 also can be effected by automatic gain control circuits (AGC) together with an automatic threshold control circuit (ATC) and the use of transistors, one transistor connected in series with the potentiometer 32 and another transistor connected in parallel with the potentiometer 40. The AGC adjusts the low level video boost gain for various scene levels, while the ATC maintains the threshold at which the video boost gain begins. For a preferred embodiment of an AGC circuit, see FIG. 4. As the curve 62 indicates, point B is black and point C is white, with the video signal extending therebetween. The dark signal segment is found between the points B and D and the bright signal segment between the points D and C. As indicated, the dark signal segment is subjected to high gain by the VIE 20. This high gain preferably represents about a tenfold increase in the level of the incoming composite video signal. The bright signal segment between the points D and C, on the other hand, is subjected to diminished low gain by the VIE 20, preferably about a one half decrease in the level of the incoming composite video signal. As illustrated by transfer characteristics 60, preferably smooth transitions are made between gains at points of inflection B and D. The dashed line 66 represents an output composite video signal at unity gain without the utilization of the video image enhancer (VIE) 20 of the invention, illustrating that the same total dynamic range is provided by the video image enhancer (VIE) 20.

Thus it has been shown and described a video image enhancer (VIE) 20 designed for use in video surveillance systems 10 at low light levels to enhance dark segments of an incoming composite video signal so as to obviate dead spots in a surveyed scene, which VIE 20 and system 10 satisfy the objects and advantages set forth above.

Since certain changes may be made in the present disclosure without departure from the scope of the present invention, it is intended that all matter described in the foregoing specification or shown in the accompanying drawings, be interpreted in an illustrative and not in a limiting sense.

What is claimed is:

1. A video image enhancer comprising:
   (a) an input designed to receive a composite video signal having high and low contrast segments and dark and bright segments;
   (b) a device coupled to said input and designed to selectively amplify said low contrast segments and said dark segments of said composite video signal, and to selectively diminish said high contrast segments and said bright segments, said device being a non-inverting operational amplifier having a non-inverting input and an output;
   (c) a first variable potentiometer and a dc restorer circuit connected to said non-inverting input of said device to provide an adjustable-bias dc clamp of said composite video signal;
   (d) a second variable potentiometer connected between a negative input and said output of said device for adjusting the gain of said device at said output;
   (e) a driver coupled to said output of said device to provide a low impedance output video signal with said low contrast and dark segments enhanced and with said high contrast and bright segments diminished; and
   (f) a signal shaping network in the form of a diode clamp connected to said output of said device.

2. The video image enhancer of claim 1 wherein said driver comprises a pair of NPN transistors connected in an emitter-base configuration, and wherein said device is R-C coupled to said input of said video image enhancer.

3. The video image enhancer of claim 1 which further includes an apparatus designed for surveying a scene and generating said composite video signal representative of said scene, and a monitor having automatic gain control circuits and a video screen for displaying said low impedance output video signal of said video image enhancer.

4. The video image enhancer of claim 3 wherein said apparatus is a TV camera and said monitor is a TV monitor, and wherein said TV camera and said TV monitor are respectively connected to said video image enhancer in a closed circuit operation by flexible cables.

5. The video image enhancer of claim 4 wherein said potentiometers can be set manually or automatically, and in the automatic mode are controlled by said automatic gain control circuits in said monitor.

6. The video image enhancer of claim 5 wherein said controlled potentiometers are bipolar transistors.

7. The video image enhancer of claim 3 wherein said apparatus includes a plurality of TV cameras not exceeding ten.

* * * * *